United States Patent
Jaegers et al.

(10) Patent No.: US 8,548,695 B2
(45) Date of Patent: Oct. 1, 2013

(54) METHOD FOR UNLOCKING AN AUTOMATIC TRANSMISSION IN AN EMERGENCY

(75) Inventors: Thomas Jaegers, Kaufering (DE); Frank Gielisch, Karlsfeld (DE); Rainer Andres, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 979 days.

(21) Appl. No.: 11/712,997

(22) Filed: Mar. 2, 2007

(65) Prior Publication Data

US 2007/0151314 A1   Jul. 5, 2007

Related U.S. Application Data

(63) Continuation of application No. PCT/EP2005/008923, filed on Aug. 17, 2005.

(30) Foreign Application Priority Data

Sep. 2, 2004   (DE) .......................... 10 2004 042 417

(51) Int. Cl.
*B60W 30/00*   (2006.01)
(52) U.S. Cl.
USPC ............. 701/51; 701/62; 192/218; 192/220.4
(58) Field of Classification Search
None
See application file for complete search history.

(56) References Cited

U.S. PATENT DOCUMENTS

| | | | | |
|---|---|---|---|---|
| 4,246,990 A * | 1/1981 | Strantz | .......................... | 192/221 |
| 4,274,307 A * | 6/1981 | Iwanaga et al. | ................ | 477/150 |
| 4,785,917 A * | 11/1988 | Tateno et al. | ................... | 477/78 |
| 4,841,816 A * | 6/1989 | Bullock | ........................ | 477/134 |
| 4,843,901 A * | 7/1989 | Peterson et al. | ................. | 74/335 |
| 4,867,291 A * | 9/1989 | Holman et al. | ............. | 192/219.3 |
| 4,899,619 A * | 2/1990 | Melnik et al. | ................... | 74/625 |
| 5,031,735 A * | 7/1991 | Holmes | ........................ | 192/3.57 |
| 5,211,271 A * | 5/1993 | Osborn et al. | ............. | 192/220.3 |
| 5,402,870 A * | 4/1995 | Osborn | ....................... | 192/220.7 |
| 5,522,776 A * | 6/1996 | Alvey | .............................. | 477/35 |
| 5,751,073 A * | 5/1998 | Ross | ........................... | 307/10.5 |
| 5,842,384 A * | 12/1998 | Berger | ............................ | 74/529 |
| 6,142,034 A * | 11/2000 | Rempinski | ..................... | 74/473.22 |
| 6,406,102 B1 * | 6/2002 | Arnold | ............................ | 303/20 |
| 6,443,276 B2 * | 9/2002 | Ahnert et al. | ................ | 192/3.56 |
| 6,559,764 B1 * | 5/2003 | Neuner et al. | ................ | 340/438 |

(Continued)

FOREIGN PATENT DOCUMENTS

DE     43 17 257 C1    5/1994
DE     199 20 095 C1   8/2000

(Continued)

OTHER PUBLICATIONS

International Search Report dated Oct. 25, 2005 with English translation (Six (6) pages).

(Continued)

*Primary Examiner* — Jonathan M Dager
(74) *Attorney, Agent, or Firm* — Crowell & Moring LLP

(57) ABSTRACT

A method is provided for emergency unlocking of an automatic transmission in a vehicle. The transmission may be unlocked from a blocked state for protection against unauthorized use, by an emergency unlocking unit. Upon actuation of the emergency unlocking unit, the automatic transmission cannot be operated in a forward driving mode.

10 Claims, 3 Drawing Sheets

(56) References Cited

U.S. PATENT DOCUMENTS

| | | | |
|---|---|---|---|
| 6,918,314 B2* | 7/2005 | Wang | 74/335 |
| 7,334,497 B2* | 2/2008 | Giefer et al. | 74/473.12 |
| 2002/0029951 A1* | 3/2002 | Beattie et al. | 192/220.4 |
| 2002/0170376 A1* | 11/2002 | Giefer et al. | 74/532 |
| 2002/0184959 A1* | 12/2002 | Ahnert et al. | 74/335 |
| 2004/0010361 A1* | 1/2004 | Gierer et al. | 701/62 |
| 2004/0107790 A1* | 6/2004 | Maeda et al. | 74/484 R |
| 2007/0135261 A1* | 6/2007 | Berger et al. | 477/96 |
| 2007/0282489 A1* | 12/2007 | Boss et al. | 701/2 |

FOREIGN PATENT DOCUMENTS

| | | |
|---|---|---|
| DE | 101 22 164 A1 | 11/2002 |
| DE | 101 28 430 A1 | 12/2002 |
| DE | 101 40 164 A1 | 3/2003 |
| DE | 102 59 893 A1 | 7/2003 |
| DE | 102 41 877 A1 | 3/2004 |
| EP | 0 315 173 A1 | 5/1989 |
| JP | 5-13626 Y2 | 4/1993 |
| JP | 08085359 A * | 4/1996 |
| JP | 2001-260689 A | 9/2001 |
| JP | 2002-539025 A | 11/2002 |
| WO | WO 00/55525 A1 | 9/2000 |

OTHER PUBLICATIONS

German Office Action dated Jun. 1, 2005 with English translation (Four (4) pages).

Japanese Office Action dated Mar. 1, 2011 and English translation thereof.

Japanese Office Action in the German-language dated Feb. 14, 2012 (three (3) pages).

* cited by examiner

METHOD FOR UNLOCKING AN AUTOMATIC TRANSMISSION IN AN EMERGENCY

This application is a Continuation of PCT/EP2005/008923, filed Aug. 17, 2005, and claims the priority of DE 10 2004 042 417.9, filed Sep. 2, 2004, the disclosures of which are expressly incorporated by reference herein.

BACKGROUND AND SUMMARY OF THE INVENTION

The invention relates to a method for emergency unlocking of an automatic transmission of a vehicle.

A device for protecting a vehicle from unauthorized use is known from German patent publication DE 101 22 164 A1, for example. In this patent document, a gear selector lever is locked in a non-operational position when the vehicle is turned off. Driving the vehicle is impossible even with unauthorized startup of the engine, e.g., by short-circuiting the ignition, because the gear selector lever is in a non-operational position. The gear selector lever can be unlocked from this non-operational position only with an ignition key.

In addition, there are known vehicles having an automatic transmission with which the transmission is automatically shifted to the park setting as soon as the engine is shut down, unless the transmission is in neutral and the key or some other identification means is inserted into the ignition lock. Without renewed identification, the transmission cannot be brought to another status or a different mode. If the driver cannot identify himself, e.g., because he has lost his key or identification card or the vehicle is defective, the automatic transmission must be unlocked manually by means of an emergency unlocking unit for towing because otherwise the drive wheels would be locked. If the transmission is unlocked by means of the emergency unlocking unit, the transmission can be switched to any operating modes, including a driving mode.

The object of this invention is to provide a method for emergency unlocking of an automatic transmission which offers improved protection against unauthorized use of the vehicle.

The inventive method for unlocking an automatic transmission of a vehicle from a blocked state for protection against unauthorized use by means of an emergency unlocking unit is characterized in that when the emergency unlocking unit is operated, the automatic transmission cannot be operated in a forward driving mode.

The blocked state of the vehicle is when, for example, no user of the vehicle can be identified and the engine is off. The identification may be accomplished either by inserting a key or some other identification means into the ignition lock or by means of a magnetic card that identifies the driver or a transmission device that need not be connected directly to the vehicle. In general terms, a blocked state should prevail when no use of the vehicle is intended. As long as the vehicle is in a blocked state, the automatic transmission is locked, usually in the park setting and thus it is impossible to shift gears. The automatic transmission can be shifted mechanically by a traditional gear selector lever or electrically by means of a gear selector switch and a control unit. For example, if the vehicle must be towed because of an engine defect and if identification is no longer possible, the automatic transmission can be unlocked by means of the emergency unlocking unit. According to this invention, however, the automatic transmission cannot then be operated in the forward driving mode. Accordingly, the automatic transmission may not be operated in forward driving mode even when the gear is shifted to a manually switchable mode. The advantage is that an unauthorized user of the vehicle who might indeed start the vehicle without identification means cannot nevertheless drive it away even if he operates the emergency unlocking unit.

Operation of the automatic transmission in the forward driving mode may advantageously be prevented by mechanical or electrical means, whereby the advantage of preventing this action electrically is that there need not be any additional mechanical blocking device in the vehicle.

Operation of the automatic transmission in the forward driving position can advantageously be prevented by the fact that a gear selector lever which is provided in the vehicle cannot be moved into the forward driving position on activation of the emergency unlocking unit. The gear selector lever can be prevented by means of a mechanical blocking device from being moved into the forward driving position, for example. If the gear selector lever cannot be moved into the forward driving position, the control unit triggering the electrohydraulic valves of the automatic transmission cannot receive a forward driving signal from the gear selector lever and accordingly it cannot send the automatic transmission a triggering signal for operation of the automatic transmission in forward driving mode.

In another possible embodiment, operation of the automatic transmission in the forward driving mode can also be prevented by the fact that advantageously the control unit present in the vehicle cannot send a signal for operation of the automatic transmission in a forward driving mode on operation of the emergency unlocking unit for selecting a driving mode and/or for triggering the electrohydraulic valves of the automatic transmission. If the control unit were to receive an input signal for operation of the automatic transmission in the forward driving mode from the gear selector lever, then according to this possible embodiment, it would not trigger the electrohydraulic valves of the automatic transmission. The control unit then could not perform any triggering of the automatic transmission at all, for example, or it could perform such triggering as if it had received an input signal for operation of the automatic transmission from the gear selector lever in parking mode or in neutral mode.

On operation of the emergency unlocking unit, the automatic transmission advantageously also cannot be operated in a reverse driving mode. However, this advantageous embodiment is possible only with electric blocking via the control unit because in mechanical blocking of the gear selector lever, no shifting at all would be possible because in the gear selector unit, the reverse driving position is situated between the park setting and the neutral position. Then the transmission could also no longer be operated in the neutral mode, as is required in towing operation.

The emergency unlocking unit may advantageously be operated via a locking cylinder. Such requirements are stipulated in various countries to provide additional protection against unauthorized emergency unlocking.

Other objects, advantages and novel features of the present invention will become apparent from the following detailed description of the invention when considered in conjunction with the accompanying drawings.

DETAILED DESCRIPTION

Figure 1:
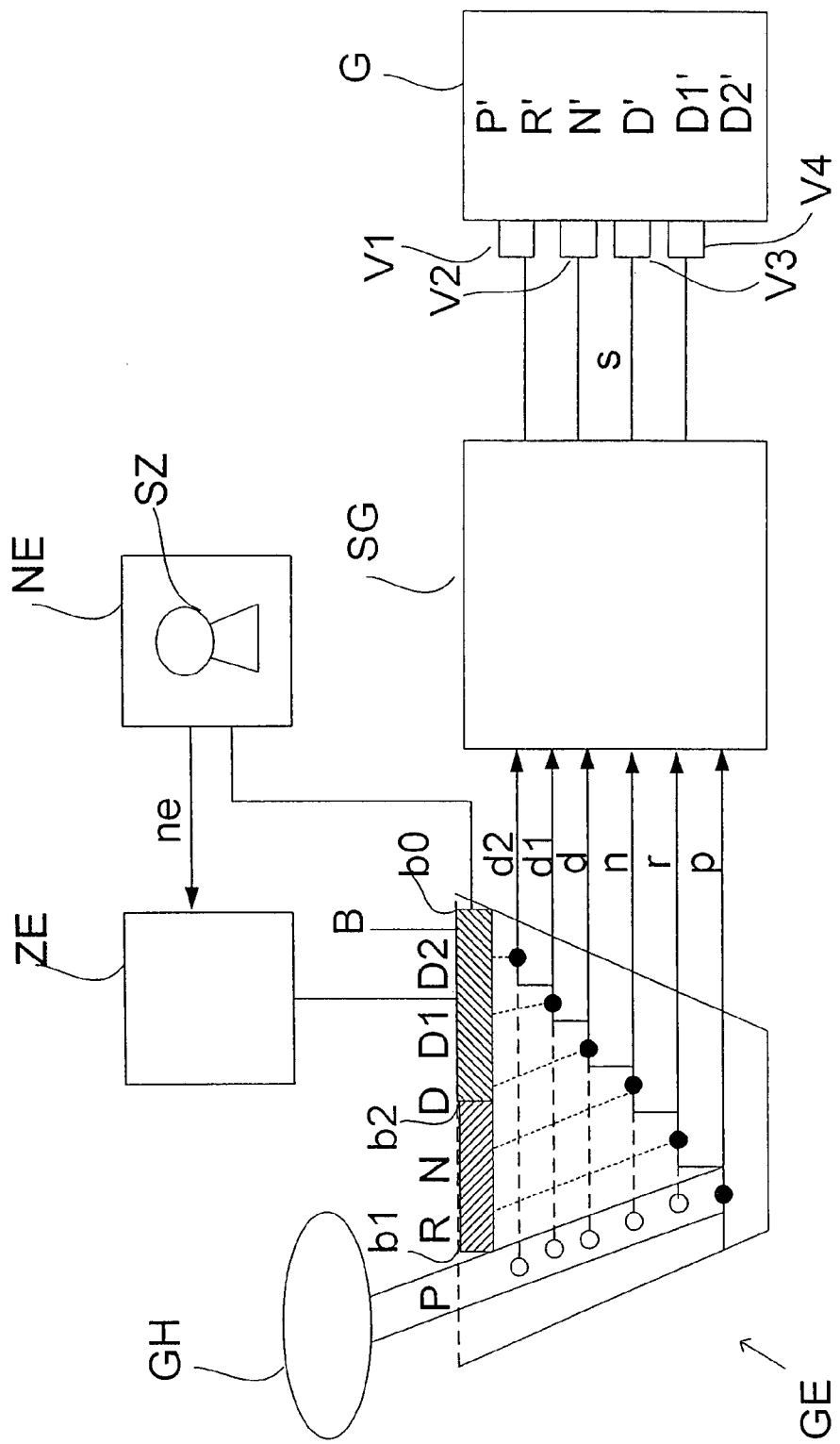
FIG. 1 shows a device used in an embodiment of the inventive method.

FIG. 1 shows a gear selector lever unit GE which sends different signals p, r, n, d, d1 or d2 to a transmission control unit SG as a function of the position of the gear selector lever GH. The transmission control unit SG is designed so that it generates an output signal as a function of the input signal (p, r, n, d, d1 or d2) for triggering the electrohydraulic valves V1, V2, V3 and V4 of the automatic transmission G to shift to one of the modes P', R', N', D', D1' or D2'. In addition, the gear selector unit GE is connected to a state recognition unit ZE which shifts a blocking device B that is present in the gear selector lever unit GE in two positions b0, b1 or b2 as a function of the mode of the vehicle. In addition, there is also an emergency unlocking unit NE that is electrically and/or mechanically connected to the transmission gear selector unit GE by the state recognition unit ZE and on activation thereof sends a signal ne to the state recognition unit and/or shifts the blocking unit B directly.

In the unblocked state, the gear selector lever GH can assume positions P, R, N, D, D1 and D2 whereby P corresponds to a park setting, R corresponds to a reverse driving position, N corresponds to a neutral position, D corresponds to a forward driving position and D1 and D2 correspond to specific forward driving positions. In the unblocked state, the blocking device B which is present in the gear selector lever unit GE is in position b0.

If the state recognition device ZE detects a blocked state of the vehicle, e.g., because the internal combustion engine is off and there is valid identification of a driver, then the gear selector lever GH is automatically shifted into the position P and the blocking unit B is shifted to the blocked position b1. However, the blocked state might also prevail when the gear selector lever is in the park setting, the engine is off and there is no valid identification of a user. The gear selector lever GH cannot be moved out of the park setting when in the blocked state. Thus the gear selector unit GE can only send the signal p to the transmission control unit SG, which then controls the valves V1 through V4 of the automatic transmission G in such a way that the transmission can then be operated only in park mode P'.

Then if an emergency unlocking unit NE which is provided in the vehicle and is connected either directly to the gear selector level unit GE or indirectly to the gear selector lever unit GE via the state recognition unit ZE, then the blocking device B is shifted out of the blocked position b1 into the half-unblocked position b2. The gear selector lever GH can therefore be brought into positions P, R and N, although not into the forward driving position D, D1 and D2. Thus the automatic transmission G also cannot be operated in one of the forward driving modes D', D1 or D2. Advantageously the emergency unlocking unit NE is operated via a locking cylinder SZ to also protect the emergency unlocking unit NE against unauthorized use. If the blocked state is cancelled by a valid identification and startup of the engine, then the blocking device is shifted back to the unblocked position b0.

Figure 2:
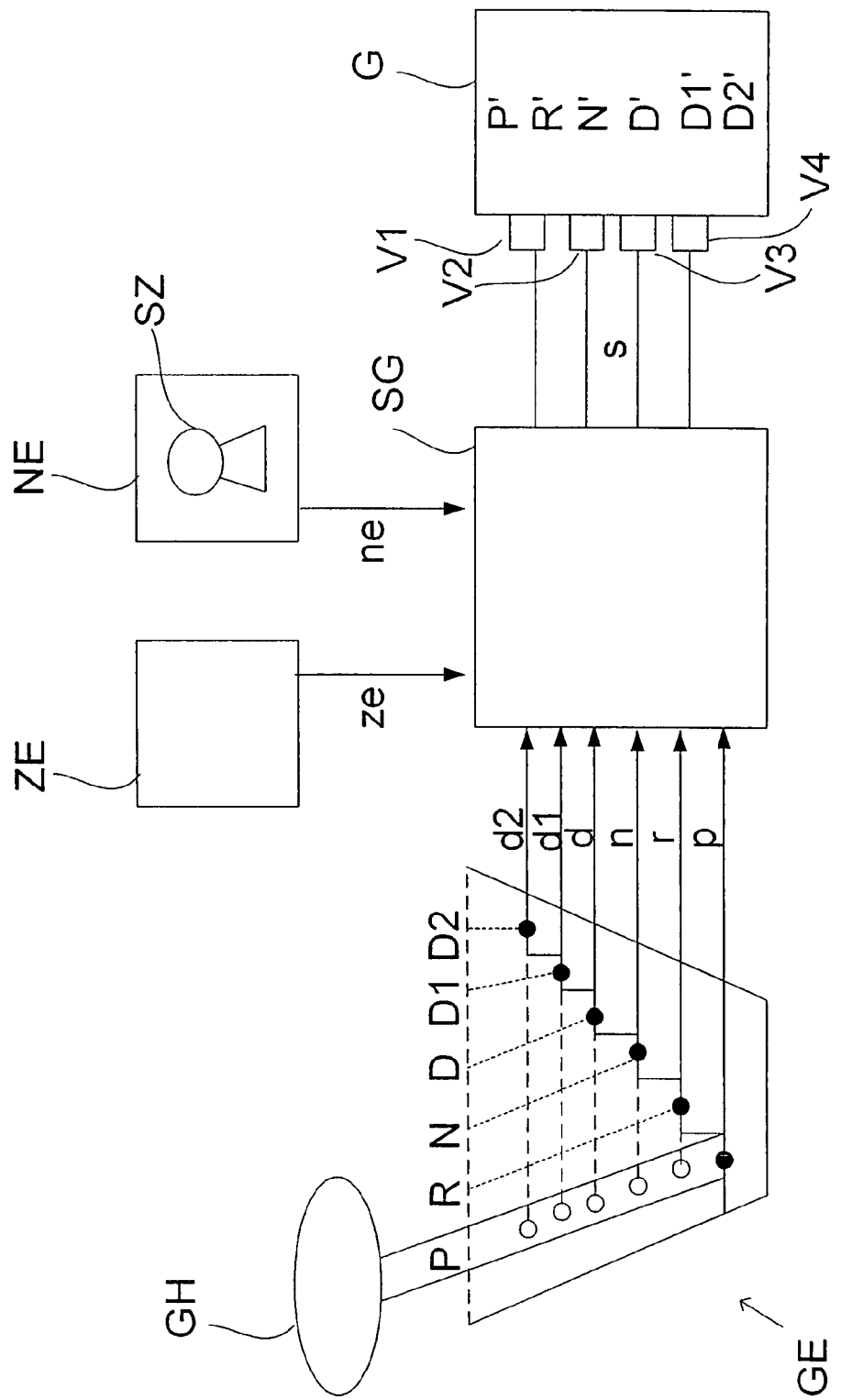
FIG. 2 shows an alternative device to FIG. 1.

FIG. 2 shows an alternative device to that in FIG. 1. With this device, the blocking and unblocking of the respective transmission modes P', R', N', D', D1' and D2' of the automatic transmission G are accomplished only via the transmission control unit SG. In contrast with FIG. 1, no blocking device is provided in the gear selector unit GE in FIG. 2. The state recognition unit ZE and the emergency unlocking unit NE are directly connected to the transmission control unit SG, whereby the state recognition unit ZE sends a signal ze to the transmission control unit when the vehicle is in the blocked state. The emergency unlocking unit NE sends a signal ne to the transmission control unit SG when it is operated. The emergency unlocking unit NE is here again advantageously actuated via a locking cylinder SZ to also protect the emergency unlocking unit NE from unauthorized use.

As long as the vehicle is in the unblocked state, i.e., is not receiving a signal ze from the stage recognition unit ZE, the transmission control unit SG controls the valves V1 through V4 of the automatic transmission G in such a way that, depending on the position of the gear selector lever GH, the automatic transmission G is operated in the mode P', R', N', D', D1' or D2', corresponding to the gear selector lever positions P, R, N, D, D1 or D2.

If the vehicle is in a blocked state, the state recognition unit ZE sends a signal ze to the transmission control unit SG. The transmission control unit SG then no longer analyzes the input signals p, r, n, d, d1 and d2 from the gear selector unit GE for this purpose but instead triggers the valves V1 through V4 of the automatic transmission G in such a way that the automatic transmission G can be operated only in the parking mode P'.

Now if the emergency unlocking unit NE is actuated in the blocked state, it sends a signal ne to the transmission control unit SG. Then the transmission control unit SG analyzes the input signals p, r and n from the gear selector unit GE but does not analyze input signals d, d1 and d2 which are obtained in gear selector lever positions D, D1 and D2. For example, if the vehicle user moves the gear selector lever GH in the emergency unlocked state into position N, the gear control unit SG receives signal n as input. Then the transmission control unit SG triggers the valves V1 through V2 of the automatic transmission G in such a way that the automatic transmission G is operated in neutral mode N'. However, if the vehicle user moves the gear selector lever GH into position D and the transmission control unit SG receives signal d as input, this is not analyzed by the transmission control unit SG. Depending on how the transmission control unit SG is designed, it does not trigger vales V1 through V4 of the automatic transmission G at all, so that the automatic transmission G remains in the last mode set or it triggers the valves V1 through V4 in such a way that the automatic transmission G is automatically operated in parking mode P' or in neutral mode N'. The transmission control unit SG is advantageously designed so that it also does not analyze the input signal r sent by the reverse driving position R of the gear selector lever GH. Therefore the automatic transmission G can be operated only in the parking mode P' or in neutral mode N'.

FIGS. 1 and 2 show only two exemplary devices for the method according to this invention. For example, it would also be conceivable for the state recognition unit ZE to be integrated into the control unit or for the analysis of the emergency unlocking unit to be integrated into the state recognition unit or for the gear selector lever to be mechanically blocked in the blocked state of the vehicle and, on actuation of the emergency unlocking unit, for the mechanical lock to be cancelled and forward driving modes to be prevented only by triggering via the transmission control unit. However, this list is far from complete so a number of other details may be designed quite different from the above description without going beyond the content of the patent claims.

Figure 3:
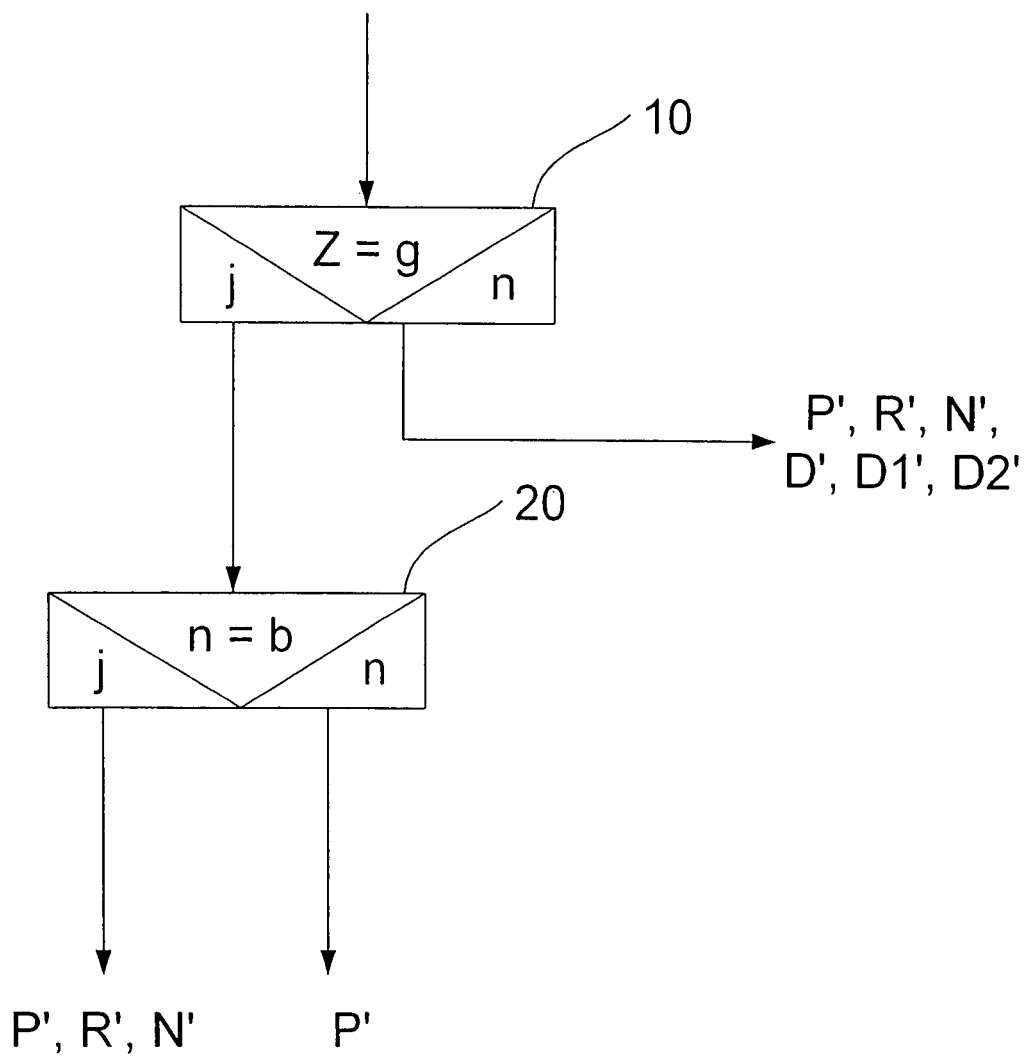
FIG. 3 shows a flow chart of an embodiment of the inventive method.

FIG. 3 shows a flow chart of the inventive method.

In a first step 10, the mode of the vehicle is analyzed. If the vehicle is not in a blocked state, i.e., ze=n, then the automatic transmission is freely shiftable into all modes P', R', N', D', D1' and D2' and the sequence of the method begins again from the beginning in step 10. However, if the vehicle is in a blocked state, i.e., ne=j, then in the next step 20, the signal of the emergency unlocking unit is analyzed. As soon as the emergency unlocking unit is not being actuated, i.e., ne=n, the automatic transmission can be operated only in parking mode P'. The analysis then begins again in step 10. However, if the emergency unlocking unit is actuated so that ne=j, the automatic transmission can no longer be operated in a forward driving mode, i.e., not in D', D1' or D2'. The automatic transmission can be operated only in parking mode P', in reverse driving mode R' and in neutral mode N'. With a suitable device, e.g., according to FIG. 2, operation in the reverse driving mode R' can advantageously also be prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for emergency unlocking of a vehicle automatic transmission from a blocked state to protect against unauthorized use, comprising the acts of:
   placing an emergency unlocking unit in at least one of mechanical and electrical communication with a vehicle in the blocked state to protect against unauthorized use, the vehicle being configured to prevent operation of the automatic transmission in a forward driving mode in response to emergency unlocking unit use;
   actuating the emergency unlocking unit to unlock the automatic transmission in a manner which prevents shifting of the transmission into a forward driving mode.

2. The method as claimed in claim 1, wherein operation of the automatic transmission in the forward driving mode is prevented mechanically or electrically.

3. The method as claimed in claim 1, wherein a gear selector lever of the vehicle cannot be moved into a forward driving position for engaging the forward driving mode on actuation of the emergency unlocking unit.

4. The method as claimed in claim 2, wherein a gear selector lever of the vehicle cannot be moved into a forward driving position for engaging the forward driving mode on actuation of the emergency unlocking unit.

5. The method as claimed in claim 1, wherein a control unit of the vehicle for selecting the driving mode on actuation of the emergency unlocking unit cannot send the automatic transmission a signal for operating the automatic transmission in the forward driving mode.

6. The method as claimed in claim 2, wherein a control unit of the vehicle for selecting the driving mode on actuation of the emergency unlocking unit cannot send the automatic transmission a signal for operating the automatic transmission in the forward driving mode.

7. The method as claimed in claim 3, wherein a control unit of the vehicle for selecting the driving mode on actuation of the emergency unlocking unit cannot send the automatic transmission a signal for operating the automatic transmission in the forward driving mode.

8. The method as claimed in claim 4, wherein a control unit of the vehicle for selecting the driving mode on actuation of the emergency unlocking unit cannot send the automatic transmission a signal for operating the automatic transmission in the forward driving mode.

9. The method as claimed in claim 1, wherein on actuation of the emergency unlocking unit, the automatic transmission is prevented from being operated in a reverse mode.

10. The method as claimed in claim 1, wherein the emergency unlocking unit is actuated via a locking cylinder.

* * * * *